United States Patent
Abu-Amara

(10) Patent No.: US 8,893,302 B2
(45) Date of Patent: Nov. 18, 2014

(54) METHOD FOR MANAGING SECURITY KEYS UTILIZED BY MEDIA DEVICES IN A LOCAL AREA NETWORK

(75) Inventor: Hosame H. Abu-Amara, Round Lake, IL (US)

(73) Assignee: Motorola Mobility LLC, Libertyville, IL (US)

(*) Notice: Subject to any disclaimer, the term of this patent is extended or adjusted under 35 U.S.C. 154(b) by 1378 days.

(21) Appl. No.: 11/270,231

(22) Filed: Nov. 9, 2005

(65) Prior Publication Data

US 2007/0107062 A1 May 10, 2007

(51) Int. Cl.
*G06F 17/30* (2006.01)
*G06F 7/04* (2006.01)
(Continued)

(52) U.S. Cl.
CPC ......... *H04N 7/1675* (2013.01); *H04N 21/4367* (2013.01); *H04N 7/17318* (2013.01); *G06F 21/10* (2013.01); *H04L 63/102* (2013.01); *H04N 21/63345* (2013.01); *H04N 21/4627* (2013.01); *H04N 21/25816* (2013.01); *H04N 21/8355* (2013.01); *H04N 21/4181* (2013.01); *H04N 7/165* (2013.01); *H04N 21/472* (2013.01); *H04N 21/2541* (2013.01); *G06F 2221/0786* (2013.01); *H04N 21/835* (2013.01); *H04L 2463/101* (2013.01); *H04N 21/2347* (2013.01); *H04N 21/6581* (2013.01); *H04N 21/43615* (2013.01); *H04N 21/41407* (2013.01); *H04N 21/4405* (2013.01); *Y10S 705/901* (2013.01)
USPC ........ 726/29; 726/4; 726/5; 726/28; 380/201; 380/255; 713/189; 709/229; 705/51; 705/59; 705/901

(58) Field of Classification Search
USPC ................ 713/193, 153; 726/1–7, 21, 26–29; 380/255, 201, 278, 277; 705/51, 59, 705/901, 908
See application file for complete search history.

(56) References Cited

U.S. PATENT DOCUMENTS 6,385,596 B1    5/2002  Wiser et al.
7,477,749 B2 *  1/2009  Pippuri .................. 380/284
(Continued)

FOREIGN PATENT DOCUMENTS

WO          9859282 A2     12/1998
WO     WO 03/098931 A1    11/2003
(Continued)

OTHER PUBLICATIONS

OMA, DRM Content Format V2.0, Draft Version 2.0—Apr. 20, 2004, Open Mobile Alliance.*

(Continued)

*Primary Examiner* — David Garcia Cervetti
*Assistant Examiner* — Shanto M Abedin
(74) *Attorney, Agent, or Firm* — Fenwick & West LLP

(57) ABSTRACT

A controller (900) for transferring media content rights between media devices comprising a memory (906), a user interface (910) and a transceiver (902). The memory (906) stores a list of media devices (914) capable of receiving the permissions associated with the media content from an originating device and an encryption key (920) that may be used to encrypt the permissions. The user interface (910) detects a user selection of a target device from the list of media devices (914). The transceiver (902) communicates an address (916) associated with the target device and the encryption key (920) to the originating device. Thus, the originating device is able to encrypt the permissions using the encryption key (920) and send the encrypted permissions to the address (916) associated with the target device.

8 Claims, 11 Drawing Sheets

(51) Int. Cl.

| | |
|---|---|
| *G06K 9/00* | (2006.01) |
| *G06K 15/00* | (2006.01) |
| *H04N 21/4367* | (2011.01) |
| *H04N 7/173* | (2011.01) |
| *G06F 21/10* | (2013.01) |
| *H04L 29/06* | (2006.01) |
| *H04N 21/6334* | (2011.01) |
| *H04N 21/4627* | (2011.01) |
| *H04N 21/258* | (2011.01) |
| *H04N 21/8355* | (2011.01) |
| *H04N 21/418* | (2011.01) |
| *H04N 7/16* | (2011.01) |
| *H04N 21/472* | (2011.01) |
| *H04N 21/254* | (2011.01) |
| *H04N 7/167* | (2011.01) |
| *H04N 21/835* | (2011.01) |
| *H04N 21/2347* | (2011.01) |
| *H04N 21/658* | (2011.01) |
| *H04N 21/436* | (2011.01) |
| *H04N 21/414* | (2011.01) |
| *H04N 21/4405* | (2011.01) |

(56) References Cited

U.S. PATENT DOCUMENTS

| | | | |
|---|---|---|---|
| 7,500,269 B2 * | 3/2009 | Huotari et al. | 726/27 |
| 2002/0052849 A1 | 5/2002 | McCutchen et al. | 705/59 |
| 2002/0174354 A1 * | 11/2002 | Bel et al. | 713/193 |
| 2004/0044779 A1 * | 3/2004 | Lambert | 709/229 |
| 2004/0081110 A1 * | 4/2004 | Koskimies | 370/315 |
| 2004/0107169 A1 * | 6/2004 | Lowe | 705/59 |
| 2004/0253942 A1 * | 12/2004 | Mowry et al. | 455/410 |
| 2005/0010531 A1 * | 1/2005 | Kushalnagar et al. | 705/59 |
| 2005/0028006 A1 * | 2/2005 | Leser et al. | 713/200 |
| 2005/0044361 A1 * | 2/2005 | Chang et al. | 713/167 |
| 2005/0071663 A1 * | 3/2005 | Medvinsky et al. | 713/200 |
| 2005/0086326 A1 * | 4/2005 | Manning et al. | 709/219 |
| 2005/0100162 A1 * | 5/2005 | Alve et al. | 380/210 |
| 2005/0100167 A1 * | 5/2005 | Alve et al. | 380/277 |
| 2005/0210261 A1 * | 9/2005 | Kamperman et al. | 713/182 |
| 2005/0216419 A1 * | 9/2005 | Lee et al. | 705/59 |
| 2005/0216739 A1 * | 9/2005 | Lee et al. | 713/168 |
| 2005/0265555 A1 * | 12/2005 | Pippuri | 380/284 |
| 2005/0268098 A1 * | 12/2005 | Oh et al. | 713/168 |
| 2005/0277403 A1 * | 12/2005 | Schmidt et al. | 455/410 |
| 2005/0278259 A1 * | 12/2005 | Gunaseelan et al. | 705/59 |
| 2005/0278787 A1 * | 12/2005 | Naslund et al. | 726/26 |
| 2006/0008088 A1 * | 1/2006 | Saarikivi et al. | 380/277 |
| 2006/0010498 A1 * | 1/2006 | Oh et al. | 726/26 |
| 2006/0015626 A1 * | 1/2006 | Hallamaa et al. | 709/229 |
| 2006/0018470 A1 * | 1/2006 | Paila et al. | 380/223 |
| 2006/0021056 A1 * | 1/2006 | Koppen | 726/26 |
| 2006/0034321 A1 * | 2/2006 | Paila et al. | 370/464 |
| 2006/0056324 A1 * | 3/2006 | Hyyppa et al. | 370/310 |
| 2006/0059090 A1 * | 3/2006 | Lahtinen et al. | 705/50 |
| 2006/0059094 A1 * | 3/2006 | Oh et al. | 705/51 |
| 2006/0059573 A1 * | 3/2006 | Jung et al. | 726/31 |
| 2006/0080259 A1 * | 4/2006 | Wajs | 705/51 |
| 2006/0080740 A1 * | 4/2006 | Bremer et al. | 726/26 |
| 2006/0106723 A1 * | 5/2006 | Pippuri | 705/57 |
| 2006/0136341 A1 * | 6/2006 | Wajs | 705/57 |
| 2006/0150180 A1 * | 7/2006 | Schmidt et al. | 717/173 |
| 2006/0156416 A1 * | 7/2006 | Huotari et al. | 726/27 |
| 2006/0259433 A1 * | 11/2006 | Lahtinen et al. | 705/57 |
| 2006/0282391 A1 * | 12/2006 | Peterka et al. | 705/57 |
| 2007/0008568 A1 * | 1/2007 | Senoh | 358/1.14 |
| 2007/0022306 A1 * | 1/2007 | Lindsley | 713/193 |
| 2007/0027814 A1 * | 2/2007 | Tuoriniemi | 705/59 |
| 2007/0033414 A1 * | 2/2007 | Dunko | 713/186 |
| 2007/0074017 A1 * | 3/2007 | Schmidt et al. | 713/150 |
| 2007/0079381 A1 * | 4/2007 | Hartung et al. | 726/26 |
| 2007/0094276 A1 * | 4/2007 | Isaac | 707/100 |
| 2007/0213048 A1 * | 9/2007 | Trauberg | 455/432.3 |
| 2008/0065548 A1 * | 3/2008 | Muijen | 705/51 |
| 2008/0216177 A1 * | 9/2008 | Yokosato et al. | 726/26 |

FOREIGN PATENT DOCUMENTS

| | | |
|---|---|---|
| WO | WO 03/107589 A1 | 12/2003 |
| WO | WO 2004/027588 A2 | 4/2004 |

OTHER PUBLICATIONS

OMA, DRM Architecture, Draft Version 2.0—Mar. 15, 2004, Open Mobile Alliance.*

U.S. Appl. No. 11/249,635, filed Oct. 13, 2005, Abu-Amara.

"CyRF Acrhitecture Overview and Porting Guide", Version 8 CYBIKO Advanced Technologies Division, 42 pages.

Thomas S. Messerges, Ezzat A. Dabbish, "Digital Rights Management in a 3G MobilePhone and Beyond", DRM'03, Oct. 27, 2003, Washington, DC 12 pages.

Michael Brogan, "Enhancing Digital Rights Management using the Family Domain", Proceedings of the 4th Winona Computer Science Undergraduate Research Seminar, Apr. 20-21, 0224, Winona, MN US, 7 pages.

Patent Cooperation Treaty "Notification of Transmittal of the International Search Report and the Written Opinion of the International Searching Authority, or the Declaration" for International Application No. PCT/US06/60430 dated Jun. 2, 2008, 7 pages.

The State Intellectual Property Office of the People'S Republic of China "Notification of the Second Office Action" for Chinese Patent Application No. 200680042106.1 dated Mar. 23, 2012, 6 pages.

European Patent Office "Extended European Search Report" for European Patent Application No. 006839657.1 dated Sep. 20, 2012, 10 pages.

* cited by examiner

METHOD FOR MANAGING SECURITY KEYS UTILIZED BY MEDIA DEVICES IN A LOCAL AREA NETWORK

FIELD OF THE INVENTION

The present invention relates generally to the field of security schemes for protecting content delivered to media devices. More particularly, the present invention relates to a digital rights management scheme for protecting media content transferred among devices of a local area network.

BACKGROUND OF THE INVENTION

Digital content providers, including record labels and book publishers, lose a lot of money to piracy. Copyright protection technologies such as Digital Rights Management ("DRM") of the Open Mobile Alliance ("OMA") are safeguards to drive out content thieves in the digital era. DRM plays a role to take care of digital content from its birth throughout its life cycle by preventing illegal reproduction of the content.

DRM is a set of technologies that provide the means to control the distribution and consumption of the digital media objects. In typical implementations of DRM, a rights issuer ("RI") grants a digital license, called a Rights Object ("RO"), to a device to consume a digital media content object ("CO") according to a specific set of permissions. The permissions usually are specified by using a document specification language like XrML or other similar languages. Due to the extensive protection provided by DRM, it is utilized for various types of local area networks.

One type of local area network, namely a home network, is under one administrative domain. More particular, a home network is a collection of devices and sub-networks operated by a single organization or administrative authority. The components of the domain are assumed to interoperate with mutual trust among themselves, but interoperate with other domains in a less-trusted manner. This is to be contrasted with the network domain models, which maybe under multiple administrative domains.

A home network utilizes any technology or service that makes it possible to connect home devices to each other or automate them. A home networking device may be stationary or mobile, i.e., can leave or join the network at arbitrary times. Each device may also be turned on or off at various time. A more specific definition of a home network includes linking consumer electronic devices, computers, and peripherals within a home to form a connected environment. Home networking enables a family's electronic devices and household appliances to be connected to each other. These devices can also be seamlessly connected to the Internet, offering the advantage of an added content source. Internet access also provides this application's greatest threat, however, at least from the entertainment companies' viewpoint.

Some home networking applications rely on the existence of a home networking server to provide security for home networks. The server is responsible for storing content, managing keys for secure distribution of content to home devices, authenticating the home networking to content rights issuers, and managing and enforcing permissions. The server is usually a centralized device separate from other home devices. Servers are usually unwieldy devices that require complex configuration and setup. Further, being a centralized device, a server represents a possible single point of failure. If it fails, then the home networking cannot access any protected content. Further, consumers would be required to pay a significant amount for a device whose sole function is to manage other devices. Given these difficulties, a solution is needed that avoids the use of centralized servers.

Other home networking applications, such as the OMA DRM, require each home networking device to create a separate security association with media providers, i.e., entities that provide CO's and RO's. Thus, contacting media providers to obtain content incurs a storm of communication between the home network and the media provider. This storm needs to be repeated for every media server that the home network wants to access. Network servers are not required in the home network for these applications, and the applications use the ubiquitous public key infrastructure ("PKI"). However, the media provider would offer the services of a network server to the home network. The home networking devices must use these services, with the attendant loss of privacy for the home network.

Still other home networking applications use smart cards to enable home networking to interwork with any DRM scheme. For these applications, two cards are required: a Converter Card and a Terminal Card. The Converter Card decrypts RO's from RI's, translates the received permissions into a defined permission, re-encrypts the content encryption key by using a key that the Converter Card creates, sends the key securely to the Terminal Card, and sends the re-encrypted content encryption key to the Terminal Card. The Terminal Card decrypts the key and uses it to decrypt the content encryption key. Depending on the permissions, the Terminal Card may also need to issue challenges to the terminal on which the card resides.

Unfortunately, smart card-based applications have many weaknesses. All devices must have the capability to interface with smart cards, so there is no facility to include devices that do not support smart cards. The solution also assumes that all devices are fixed, so no extension is provided for wireless devices. Thus, there is no support for group management and no mechanism for authentication or authorization in remote domains. In addition, from a permissions point of view, these smart card-based applications are very limited. All permissions are mapped to a limited set of defined permissions, so RI's are limited in specifying the types of permissions offered to users.

DETAILED DESCRIPTION OF THE PREFERRED EMBODIMENTS

Figure 1:
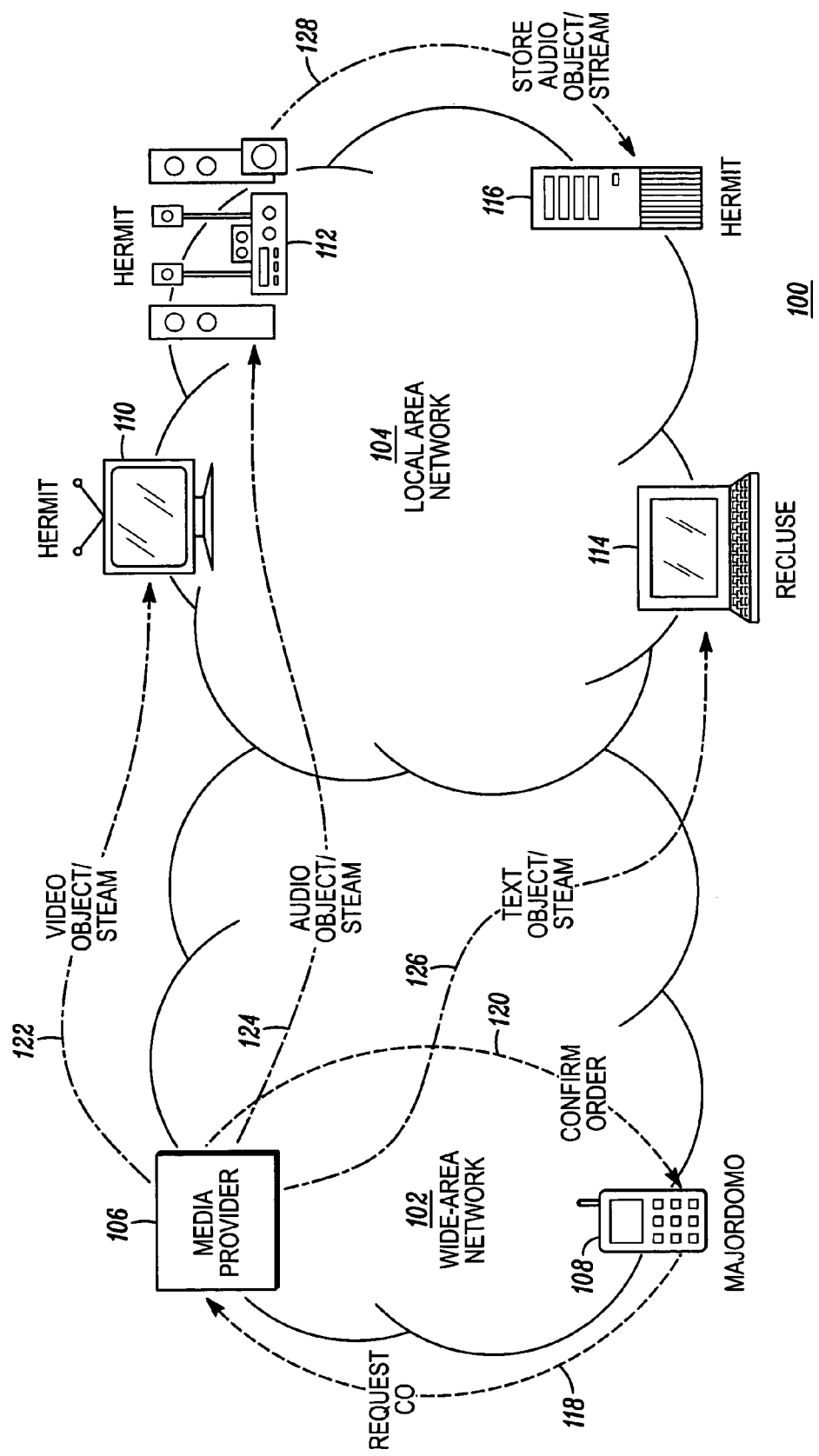
FIG. 1 is a diagrammatic view illustrating a digital security system for a media content distribution system in accordance with the present invention.

The present invention defines a framework and protocols for security management for local area networks. For example, the framework and protocols are applicable to digital rights management ("DRM") for home networking applications. Devices are used as logical, distributed, limited functionality servers that cooperatively emulate the function of network servers. The server function is value added service in the devices, not the main function for the devices. The server function is only responsible for key management and authentication.

Unlike other solutions for security management in local area networks, our solution uses media devices as logical, distributed, limited functionality network servers. By adding two main components, namely key management and distributed coordination, to media devices, the devices address the problems associated with security management in local area networks in a distributed, cooperative way without the need for a separate, dedicated, centralized server.

The framework and protocol balances the requirements of provider control and owner privacy. Also, the framework and protocol is based on a distributed system and method that avoids the use of dedicated servers. In addition, the framework and protocol permits the mobile phones to be powered off when the home networking receives content. Further, the framework and protocol does not require involvement from the user other than to select content from a Media Provider. All interactions occur in the background and automatically. In particular, the user does not need to configure the network or program any of the media devices.

One aspect of the present invention is a controller for transferring media content rights from a first media device to a second media device, in which the first media device having one or more permissions associated with a media content. The controller comprises a memory, a user interface and a transceiver. The memory is configured to store a list of media devices capable of receiving the permission(s) associated with the media content from the first media device and an encryption key that may be used to encrypt the permission(s). The user interface is configured to detect a user selection of the second media device from the list of media devices. The transceiver is configured to communicate an address associated with the second media device and the encryption key to the first media device, so that the first media device is able to encrypt the permission(s) using the encryption key and send the encrypted permission(s) to the address associated with the second media device.

Another aspect of the present invention is a method of a controller for transferring media content rights from a first media device to a second media device. The first media device has one or more permissions associated with media content. A list of media devices capable of receiving the permission(s) associated with the media content from the first media device is identified. Next, a user selection of the second media device from the list of media devices is detected. An address associated with the second media device is determined. Thereafter, the address and an encryption key are provided to the first media device. Thus, the first media device is able to encrypt the permission(s) using the encryption key and send the encrypted permission(s) to the address associated with the second media device.

Referring to FIG. 1, there is shown an exemplary digital security system 100 in accordance with the present invention. The system 100 includes a wide-area network ("WAN") 102 interconnected for communication with a local area network ("LAN") 104. The WAN 102 is typically public and Internet Protocol ("IP") based, and the WAN has some mechanism to connect to the LAN 104. The LAN 104 is not necessarily IP-based. An example of a LAN 104 is a home network as described above. The details of the mechanism to connect the WAN 102 to the LAN 104 are not relevant to this invention, but we assume that the WAN 102 may communicate with at least one public IP address of the mechanism. For one embodiment, as shown in FIG. 1, the WAN 102 includes multiple communication networks, wired and wireless, communicating data over the Internet, and the LAN 104 is a home network having media devices that may communicate via the Internet.

The WAN 102 includes a media provider or, more particularly, a media server 106 of the media provider. Media content and creative work are available from media servers 106 that customers can access by using WAN 102. Prospective customers may use a remote agent or communication devices 108, such as mobile phones or Personal Digital Assistants ("PDA's"), to browse through content offered by the media providers and their media servers. The remote agent 108 may be a wired device, but a wireless device would be much more convenient for purposes of the present invention. Examples of wireless communication devices include, but are not limited to, cellular telephones, PDA's and computing devices that utilize one or more the following technologies: analog communications (using AMPS), digital communications (using CDMA, TDMA, GSM, iDEN, GPRS, or EDGE), and next generation communications (using UMTS or WCDMA) and their variants; a peer-to-peer or ad hoc communications such as HomeRF, Bluetooth and IEEE 802.11 (a, b or g); and other forms of wireless communication.

A user with a mobile device 108, labeled Majordomo in the figure, may be away from the user's LAN 104 and may browse through a catalogue of media offerings from a media provider, i.e., at the media server 106. The user may decide to purchase multimedia content, such as a movie, to be played at a specific time after the user goes home, but the user may want to direct different portions of the multimedia content to different media devices of the LAN 104. For example, the user may want a video portion to be shown on a video media device 110, such as a flat screen television; an audio portion to play on an audio media device 112, such as a stereo; and a text to appear on a text media device 114, such as a computer. Further, the user may want to capture the audio portion in a recording media device 116, such as a digital video recorder ("DVR"), after it plays on the audio media device 112.

The particular steps for accomplishing the above operation by a user for distributing media content to a LAN 104 may be illustrated in reference to FIG. 1. A user may use the communication device 108 to communicate with the media server 106 and browse various media content or content objects available from the Media Provider. The communication device 108 may then send a request to the media server 106 to purchase a selected content object ("CO"), such as a movie, from the Media Provider. The content object may include several components, such as a video component, an audio component, and a text component at step 118. Also, the request may include a requested time for providing the content object to the LAN 104 of the user. The Media Provider may then confirm the acceptance of the order by sending a confirmation from the media server 106 to the communication device 108 at step 120. At the requested time, the Media Provider provides three separate objects or streams from the media server 106 to the LAN 104 at steps 122-126, which may occur within a same frame or otherwise synchronized with each other. For example, the Media Provider may send the video component to the video media device 110 at step 122, the audio component to the audio media device 112 at step 124, and the text component to the text media device 114 at step 126. If the user of the communication device 108 desires to store one or more of these objects or streams, the LAN 104 may include a recording media device 116 that receives them at the same time, or subsequent to, the other media devices 110-114. For example, at a time subsequent to the requested time, the audio media device 112 may forward the audio component to the recording media device 116 for recording at step 128.

In FIG. 1, the devices associated with the user may be sorted into three categories: Majordomos, Recluses, and Hermits. A Majordomo, namely the communication device 108, is a user device that has the components necessary to access directly the communication infrastructure of the LAN 104, is enabled by the administrator of the LAN to access the LAN infrastructure, has the components necessary to access the WAN 102, is enabled by the administrator of the LAN to access the WAN, and has a digital encryption certificate. A Recluse, such as text media device 114, has the same characteristics as a Majordomo except that a Recluse is allowed to receive and send security keys to devices in the LAN 104 only. A hermit, such as devices 110, 112 & 116, is a media device of the LAN 104 that does not have a digital encryption certificate.

The embodiments of the present invention balance two potentially conflicting requirements: the Provider Control requirement and the Owner Privacy requirement. For the Provider Control requirement, the Media Provider must be able to control which device consumes the protected content. This requirement is needed because some devices may be known to have security flaws, and the Media Provider may not want the content to be consumed by these devices. For the Owner Privacy requirement, the home networking owner should not have to disclose to the Media Provider details of what devices belong to the home networking. This requirement is needed to ensure privacy for the home networking owner.

Figure 2:
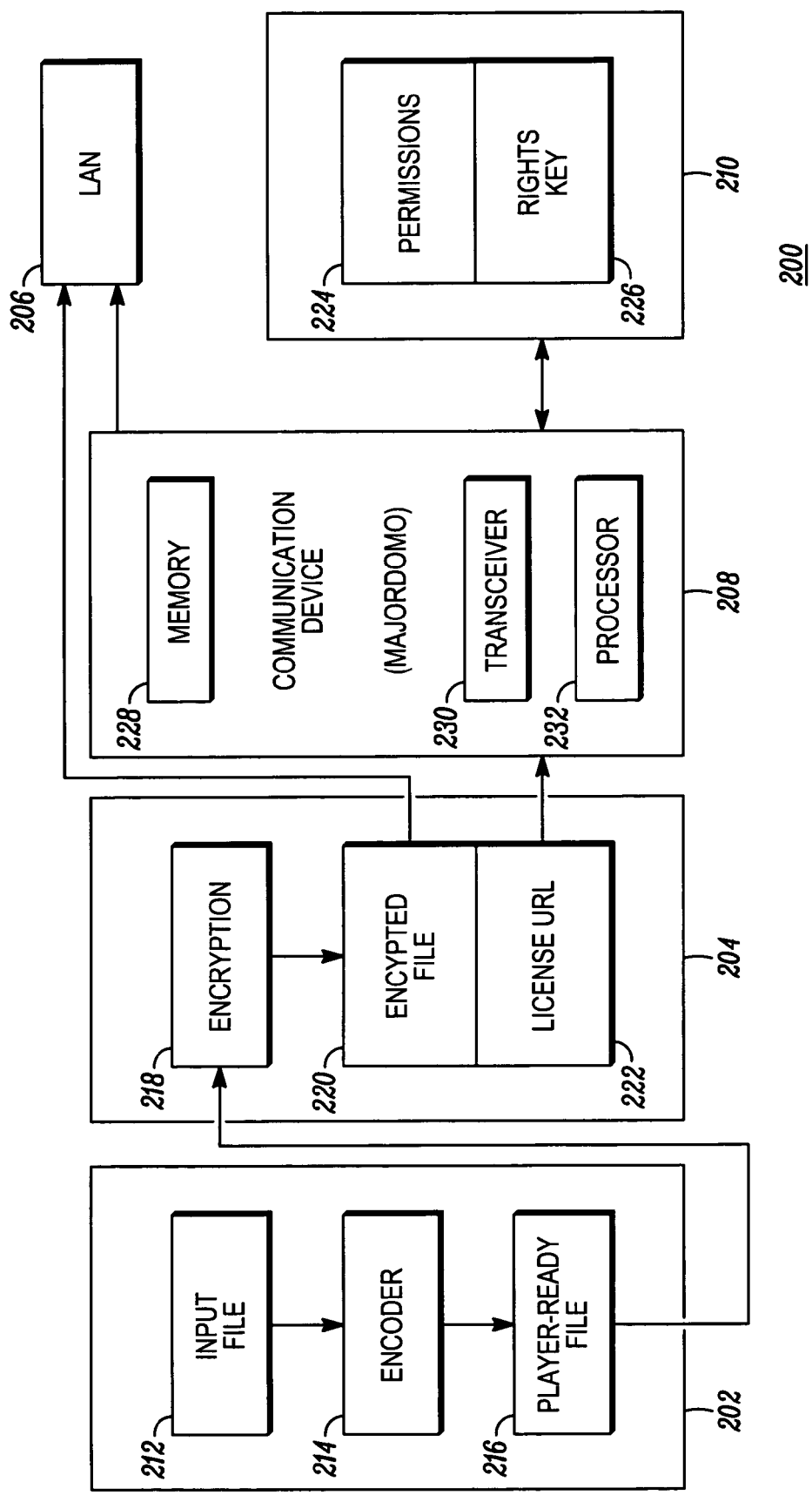
FIG. 2 is a diagrammatic diagram representing important components of a digital security system in accordance with the present invention.

Referring to FIG. 2, there is shown an exemplary digital security system 200 in accordance with the present invention. The content owner 202 creates media content and provides the media content to a content packager and/or distributor 204. It is to be understood that, even though the content packager and/or distributor 204 is shown in FIG. 2 to be a single entity, the functions of the content packager and/or distributor may be shared by more than one entity. The content packager and/or distributor 204 provides the media content to the LAN 206 and a license location associated with the media content to a communication device 208. The media devices of the LAN 206 will not be able to make use of the received media content without an appropriate license 210 for the media content. Thus, the communication device 208 retrieves the license 210 at the license location and provides the license to the LAN 206 so that the media devices at the LAN may utilize the media content received from the content packager and/or distributor.

In particular, the content owner 202 creates or otherwise obtains digital files 212. The content owner 202 then uses an encoder 214 to encode the digital files 212 into a format that media players can render, i.e., a player-ready file 216. The content owner 202 provides the player-ready file 216 to the content packager and/or distributor 204. The content packager and/or distributor 204 uses an encryption device 218 to encrypt the formatted files by using a content encryption key or object encryption key, thus forming a content encrypted file 220. The content encrypted file is provided to the LAN 206 or, more particularly, the media devices of the LAN. The content packager and/or distributor 204 also determines an address 222 identifying one or more locations where a license 210 associated with the content encrypted files may be found and provides the address to the communication device 208. For example, the address may be a URL ("uniform resource locator") that specifies locations where a license that includes the content decryption key may be purchased.

If a license 210 is not found for the content encrypted files 220, then the communication device 208 request a license by following the license address 222. A license 210 includes a permission or set of permissions 224, i.e. the type of use that the content owner allows, and a content decryption key 226. The communication device 208 may then encrypt the content decryption key 226 with a network privacy key known to one or more components of the LAN 206, and provide the encrypted key to the LAN. Upon receiving the encrypted key from the communication device 208, the media devices of the LAN 206 may use the network privacy key to decrypt the encrypted content decryption key and consume the media content according to the permissions 224 of the license 210.

Regarding the communication device 208, the communication device comprises a memory 228, a transceiver 230 and a processor 232 coupled to the memory and the transceiver. The memory 228 stores a digital security certificate associated with the communication device, certificate information associated with the media devices, and a network privacy key to provide access to the media devices. The transceiver 230 communicates the digital security certificate and the certificate information to the media provider, and receives a content key associated with the media content from the media provider. The processor 232 encrypts the content key based on the network privacy key and instructs the transceiver to provide the encrypted content key to the media devices.

Figure 3:
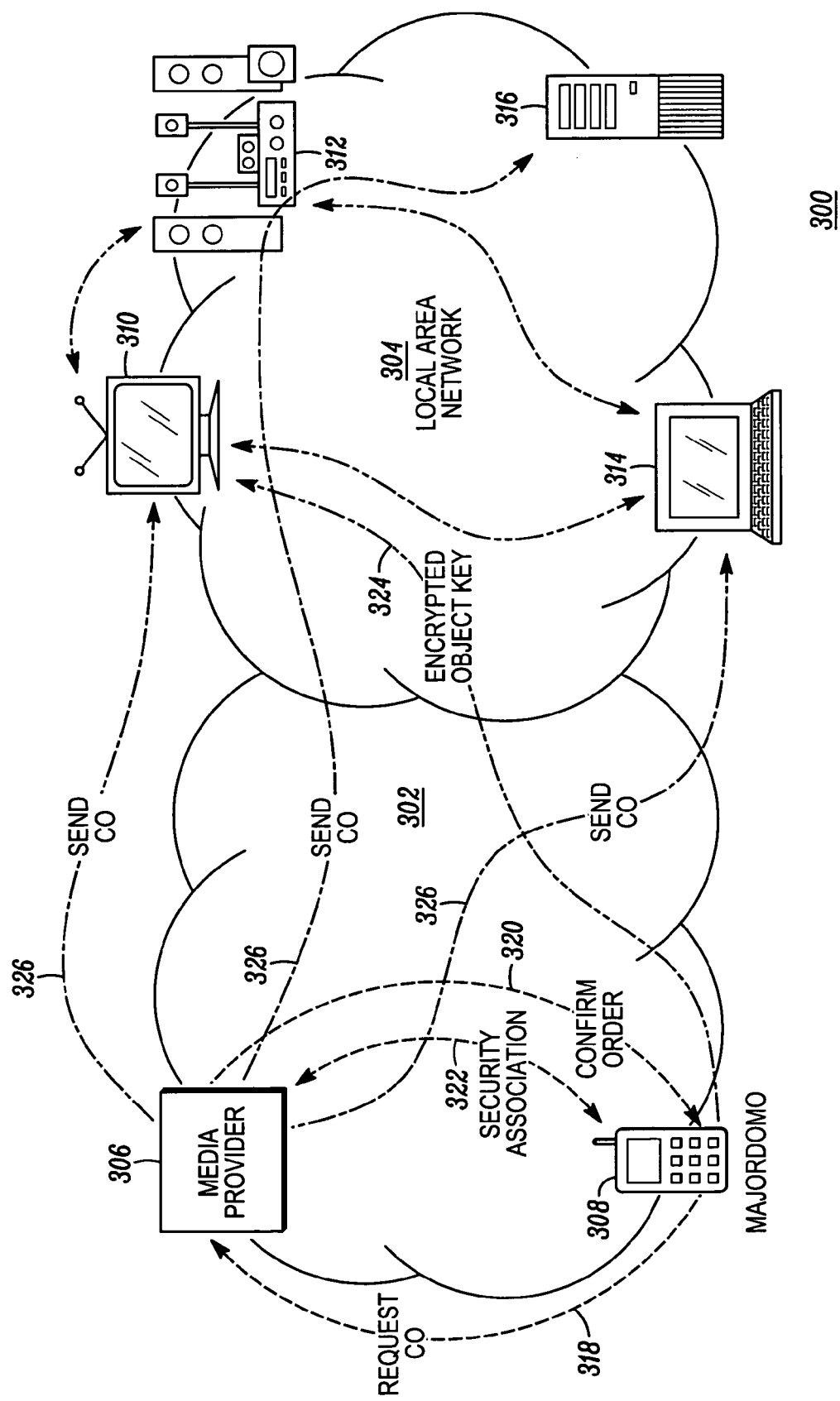
FIG. 3 is another diagrammatic view illustrating the digital security system of FIG. 1.

Referring to FIG. 3, the digital security system 300 of the present invention includes a WAN 302 and a LAN 304 and is based on public/private key encryption. The WAN 302 includes a media provider or, more particularly, a media server 306 of the media provider. A communication device 308, i.e., Majordomo, and media devices 310-316 of the LAN 304 share one network privacy key, such as the LAN decryption key or a Home Network Group Key ("HNGK"). The group key acts as a privacy key that is shared among the media devices 310-316. The Rights Issuer ("RI") and the content issuer ("CI") need to authenticate only one security agent, such as communication device 308, even though there are multiple individual physical devices 310-316 internal to the LAN 304. The communication device's interactions with the issuers are solely to authenticate the LAN 304, specify the addresses of the target LAN media devices 310-316, and obtain a content decryption key from the RI. The communication device 302 does not need to store any Rights Object ("RO") or Content Object ("CO") items. It should be noted that the CI is represented by the Media Provider, but the RI may be represented by the Media Provider or a 3rd party associated with the Media Provider.

Still referring to FIG. 3, the communication device or Majordomo 308 sends a request for a content object to the media server 306 at step 318, in which the request may include a requested time for content delivery. In response, the media server 306 returns a confirmation of acceptance of the order to the communication device 308 at step 320. Next, the communication device 308 creates a security association with the media server 306 and obtains a content decryption key from the media server at step 322. The communication device 308 obtains a content decryption key associated with the media content, encrypts the content decryption key using a network privacy key associated with the media devices of the LAN 304, and sends the encrypted content decryption key to one or more devices of the LAN at step 324. At the requested time, the media server 306 may send the encrypted media content to the media devices 310-316. For example, the media server 306 sends an encrypted video portion to the video media device 310, encrypted audio portion to the audio media device 312, and encrypted text portion to the text media device 314. One or more portions may also be recorded by recording media device 316.

Figure 4:
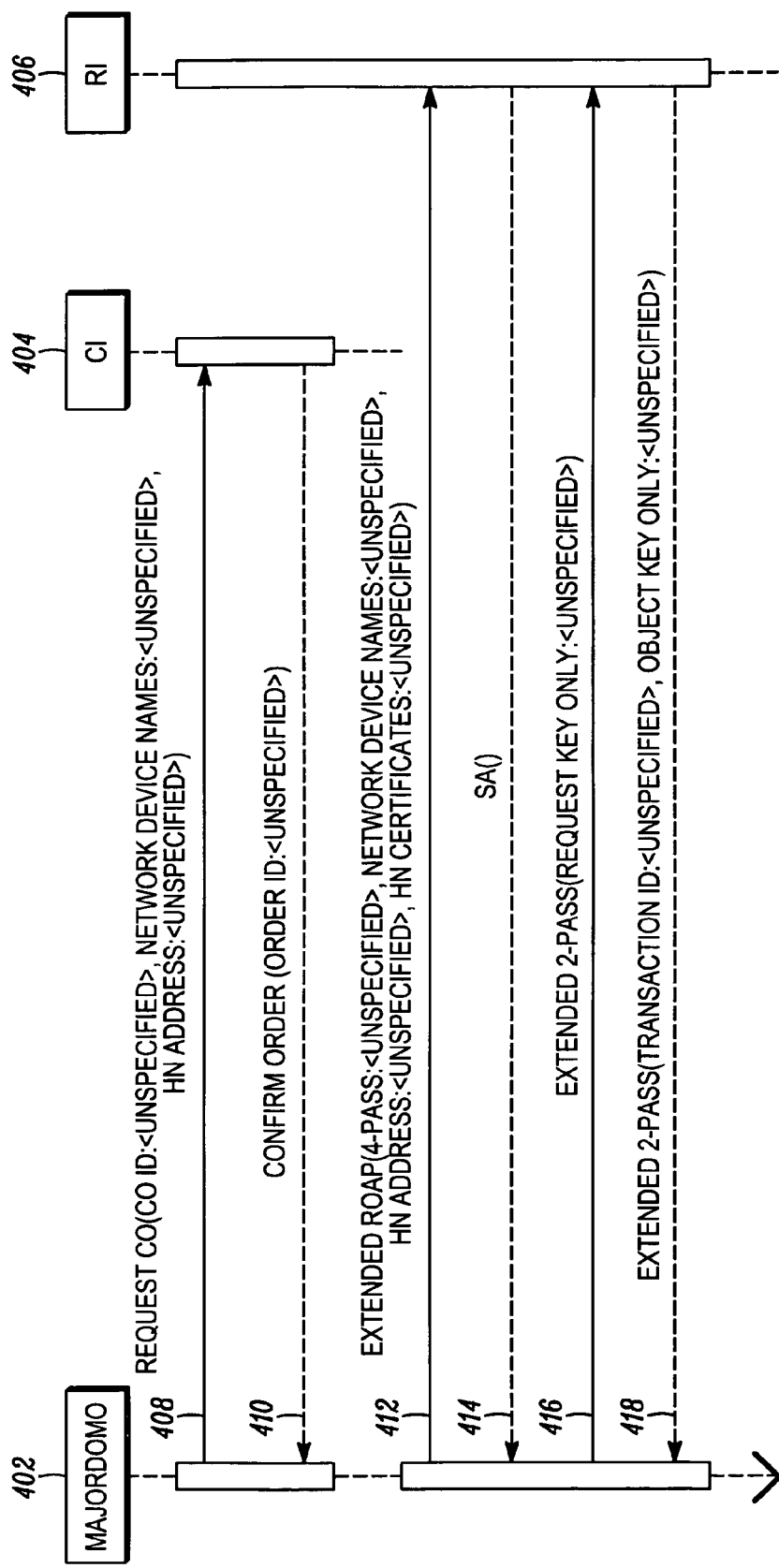
FIG. 4 is a process diagram illustrating interaction between the communication device and the issuers in accordance with the present invention.

Referring to FIG. 4, there is provided an exemplary timing diagram 400 illustrating the signaling that may occur between the communication device or majordomo 402 and the issuers 404, 406 of the present invention. As stated above, the CI is represented by the Media Provider, but the RI may be represented by the Media Provider or a 3rd party associated with the Media Provider. The communication device 402 sends a content object identification ("CO ID"), generic device names and a LAN address to the content issuer at step 408. The CO ID identifies the particular media content desired by the communication device 402, since the device may be selecting from a plurality of media content. The generic device names identify the target devices for delivery of the selected media content, such as flat screen TV, stereo, and laptop. The LAN address identifies the delivery address for the LAN and its associated media devices, such as an IP address. In response to the request, CI 404 returns an order identification to confirm the order at step 410.

After receiving confirmation from the CI, the communication device 402 obtains a license associated with the media content for the LAN. In addition to the generic device names and LAN address, the communication device 402 also provides a certificate associated with itself and certificate information associated with each one of the media devices to authenticate itself and these devices to the RI 406 at step 412. Thus, the communication device 402 also provides the certificate information of media devices to the RI 406. The certificate information associated with the media devices is either a list identifying the digital security certificates of the plurality of media devices or the digital security certificates themselves. This allows the RI 406 to check the credentials of the media devices. Note that this step maintains privacy for the LAN owner because the communication device 402 does not reveal what networking devices associated with the certificates. If the RI 406 determines that all certificates associated with the communication device 402 and the media devices are valid, then the RI returns security association acceptance at step 414. If, on the other hand, the RI 406 fails to determine that the certificate associated with the communication device 402 is valid, then the security association between the communication device and RI fails. Even if the certificate associated with the communication device 402 is valid, the RI 406 may determine that the security association fails if the certificate of one or more media devices is found to be invalid, depending upon the way that the RI is configured.

Once the RI 406 authenticates the communication device certificate and media device certificates, the communication device 402 requests the object key from the RI 406 at step 416. The RI 406 sends the object key, such as the content decryption key, to the communication device 402 at step 418, and it is not necessary to send the RO to the communication device. The communication device 402, then, encrypts the content decryption key by using the network privacy key and sends it, along with a Transaction ID, to the media devices of the LAN.

Figure 5:
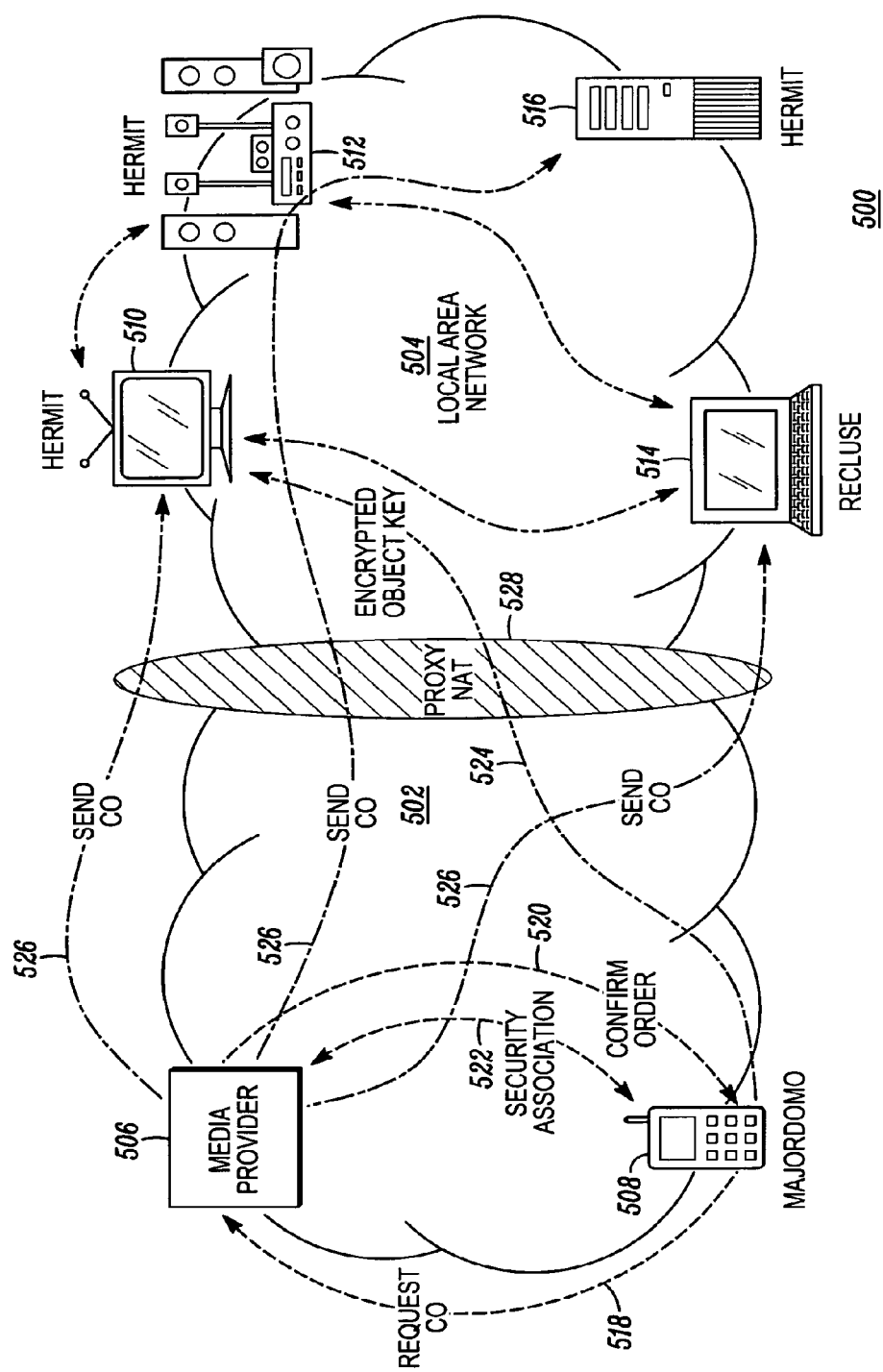
FIG. 5 is a diagrammatic view illustrating another digital security system for a media content distribution system in accordance with the present invention.

Referring to FIG. 5, there is provided another digital security system 500 for a media content distribution system in accordance with the present invention. The digital security system 500 of the present invention includes a WAN 502 and a LAN 504 and is based on public/private key encryption. The WAN 502 includes a media provider or, more particularly, a media server 506 of the media provider. A communication device 508, i.e., Majordomo, and media devices 510-516 of the LAN 504 share one network privacy key. The Rights Issuer ("RI") and the content issuer ("CI") need to authenticate only one security agent, such as communication device 508, even though there are multiple individual physical devices 510-516 internal to the LAN 504. The communication device's interactions with the issuers are solely to authenticate the LAN 504, specify the addresses of the target LAN media devices 510-516, and obtain a content decryption key from the RI.

For example, the communication device 508 makes request for a content object ("CO"), such as a movie, at step 518. The communication device 508 sends generic device names, such as $\alpha$, $\beta$, and $\delta$, to the media server 506 of the Media Provider. The Media Provider and its media server 506 do not know the capabilities of media devices $\alpha$, $\beta$, and $\delta$ and, thus, privacy for the owner of the LAN 504 is maximized. The communication device 508 also provides the certificate information of media devices 504-516 to the RI. This allows the RI to check the credentials of the media devices 504-516. The certificate information of the media devices is either a list identifying the digital security certificates of the plurality of media devices or the digital security certificates themselves. In response to the request, the media server 506 of the Media Provider confirms the acceptance of the order to the communication device 508 at step 520.

The communication device 508 then creates a security association with the media server 506 at step 522. Next, the communication device 508 obtains an object encryption key or, more particularly, a content decryption key, from the media server 506 at step 524. Also, during step 524, the communication device 508 encrypts the object encryption key by using a network privacy key, such as a home networking group key ("HNGK"), and sends it to authorized media devices in the LAN 504. Thereafter, the media server 506 of the Media Provider sends the encrypted media content to the media devices 510-516 at the requested time, as represented by step 526. For example, the media server 506 may send an encrypted video portion to the video media device 510, encrypted audio portion to the audio media device 512, and encrypted text portion to the text media device 514.

The digital security system 500 shown in FIG. 5 differs from the systems shown by the previous figures in several ways. Of particular interest is a module 528 called a Proxy Network Access Translator ("Proxy NAT"). The module 528 resides in a gateway or router that exists in the LAN 504. It should be noted that the LAN 504 may be one of three types of networks: (1) IP-based and uses public IP addresses for the devices, (2) IP-based and uses private IP addresses for the devices, or (3) not IP-based. It should also be noted that the WAN 502 is preferably IP-based. For a LAN 504 of type (2) or (3), the LAN must have a gateway or router that connects it to the WAN 502. For type (2), the gateway or router translates between the LAN private IP addresses and the WAN public IP addresses. For type (3), the gateway or router interconnects the IP-based WAN to the technology used in the LAN. Therefore, the Proxy NAT module can 528 may be added to the existing gateway and router for LAN 504 that use the configurations of network types (2) or (3). Only in type (1) it is possible that the LAN has no router or gateway. Hence, a LAN having the configuration of type (1) needs to add a router or gateway to support the Proxy NAT module 528.

Figure 6:
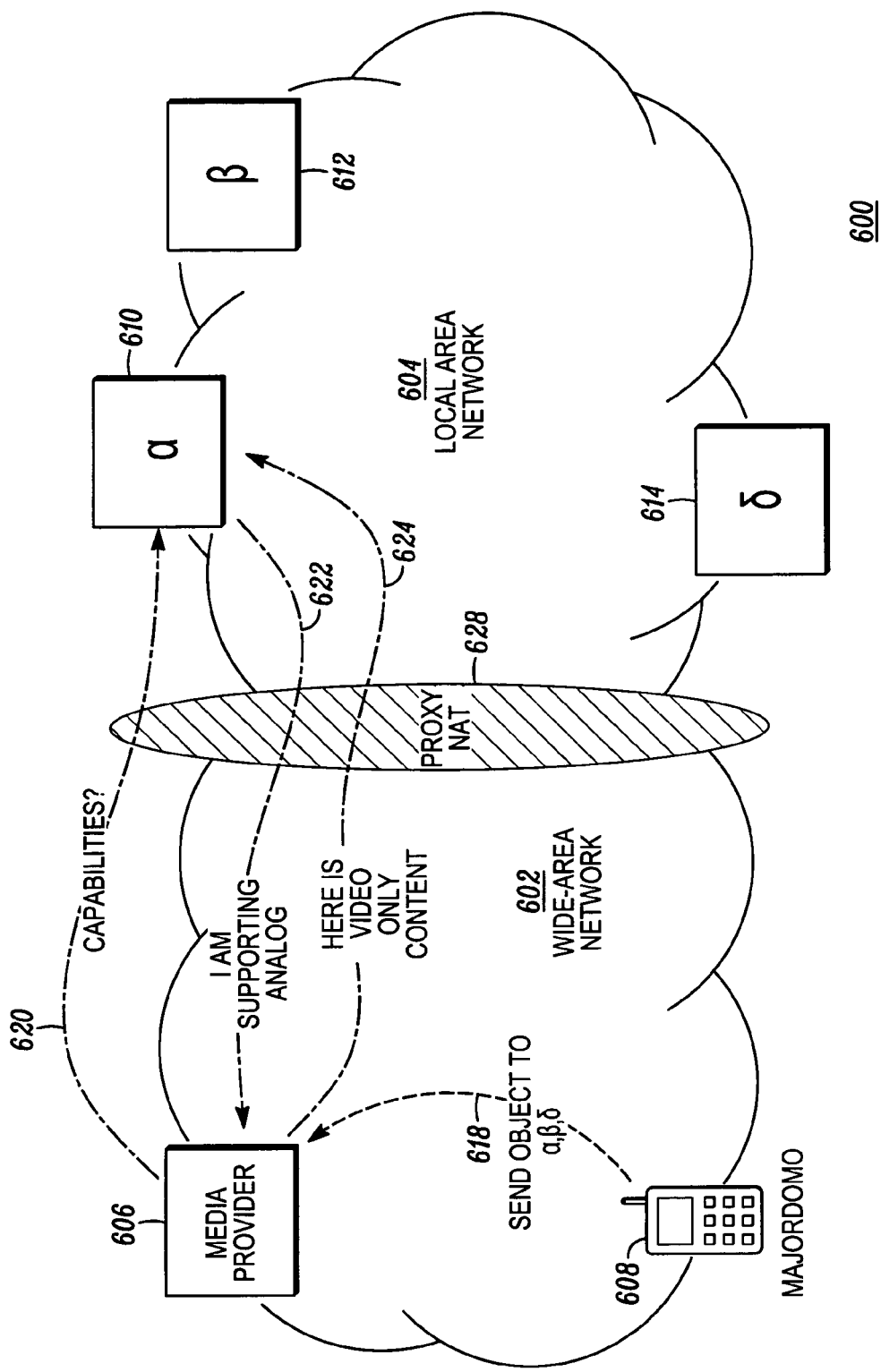
FIG. 6 is another diagrammatic view illustrating certain functions of the media content distribution system of FIG. 5.

Referring to FIG. 6, the functionality of the Proxy NAT module 528, 628 may be understood with reference to this figure. As stated above, the communication device 608 sends generic device names, such as α, β, and δ, to the media server 606 of the Media Provider. The Media Provider does not know the addresses of these media devices 610-614 but knows the address of the LAN 604 where they are located. Therefore, the Media Provider may concatenate the network address with the generic device names and rely on the Proxy NAT module 628 in the LAN 604 to translate the addresses to physical device addresses. The Proxy NAT module 628 then translates the generic device names α, β, and δ, to physical addresses and relays messages from the media server 606 of the Media Provider to the media devices 610-614. This process hides the internal structure of the LAN 604 from the Media Provider and its media server 606 and allows users to name their media devices without regard to the Media Provider.

For example, the communication device or Majordomo 608 sends generic device names, such as α, β, and δ, to the media server 606 of the Media Provider at step 618. At this time, the Media Provider does not know the capabilities of media devices α, β, and δ. The media server 606 of the Media Provider then sends a query to the LAN 604 asking for the capabilities of media devices α, β, and δ at step 620. Next, each media device responds to the media server 606 with its capabilities at step 622. For example, media device α 610 may respond by stating its capabilities as being a device capable of supporting analog video only. Thereafter, the media server 606 of the Media Provider customizes the content object ("CO") to the capabilities of each media device 610-614 before sending the appropriate CO's to the corresponding media devices at step 624.

Figure 7:
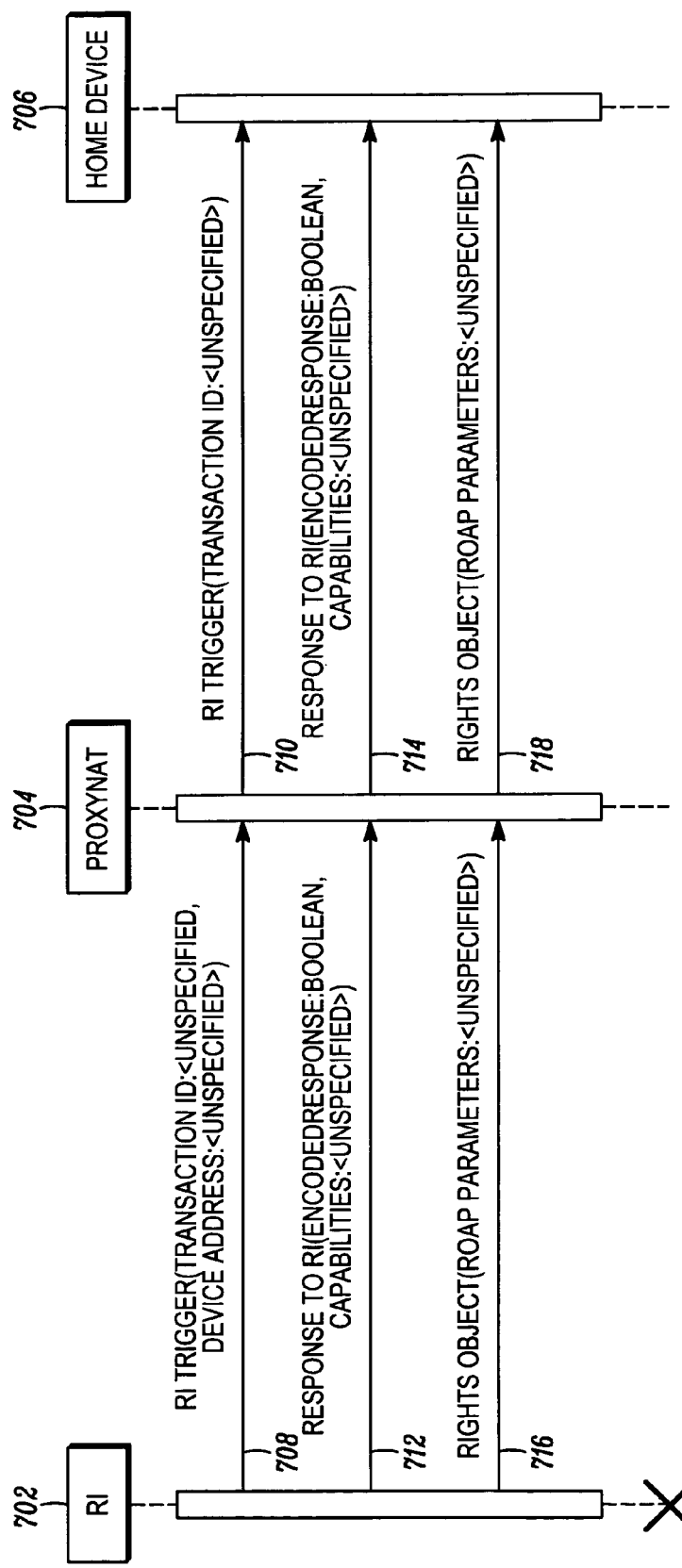
FIG. 7 is a process diagram illustrating the rights issuer and the media devices in accordance with the present invention.

Referring to FIG. 7, when the rights issuer ("RI") 702 is ready to send the rights object ("RO") to the media devices 706, the RI queries the media devices for their capabilities. Note that, because all media devices 706 and the communication device share the same network privacy key, there is no need for the devices to authenticate themselves with the RI 702. Thus, the RI 702 sends a trigger message to each of the media devices 706, where the trigger message includes a Transaction ID at step 708, 710. The Transaction ID relates the communication to a particular object encryption key. The Transaction ID is the same one that the RI 406 sent to the Majordomo 402 in step 418 of FIG. 4. Once a media device 706 locates the Transaction ID, the media device responds to the RI 702 with a description of the capabilities of the media device at step 712, 714. This description allows the RI 702 to customize the CO to the media device 706. The RI 702 then encrypts the RO's and sends them to the media devices 706 at step 716, 718.

For other embodiments, the Proxy NAT module 528, 628 may include a table for correlating a media device with a particular address and/or capability. For example, the Proxy NAT module 528, 628 may include table that correlates a media device identification to an address corresponding to the media device. Thus, the Media Provider may only know the device identification for each media device of the LAN and will not know the full identity or capabilities of each media device. However, the Proxy NAT module 528, 628 will be able to associate each device identification queried by the Media Provider with the address of the media device by looking-up the device identity in the table, thus routing communication to the appropriate devices.

The Proxy NAT module 528, 628 may include a table that includes the capabilities of each media device, thus eliminating the need to query each media device when requested by the Media Provider. For example, when the media server of the Media Provider requests the capabilities of a particular media device, the Proxy NAT module 528, 628 may merely lookup the device identity in the table to find the corresponding capabilities of the media device. Referring to FIG. 7 again, for this embodiment, portions 710, 714 and 718 of the steps become unnecessary since the Proxy NAT module 528, 628 will not need to contact the media devices. Of course, in order to function properly, the table relies upon by the Proxy NAT module 528, 628 will need to be populated in advance and/or updated on a periodic basis with the capabilities of each media device.

Examples of the capabilities of the media devices include, but are not limited to, video, image, audio and text capabilities. In each case, for example, the capabilities include the media format that the device can render. Examples of video formats include analog only, MPEG-2, MPEG-4, DivX, MJPEG, MJPEG2000, H.263, H.264, Sorenson, and the like. Examples of audio formats include mono, stereo, surround-sound, MP3, AAC, Ogg Vorbis, and the like. Examples of text formats include language, closed-captioning, commentary, and the like.

The present invention provides benefits to users, content providers, and device manufacturers. Users may benefit from simplicity of use and configuration. Each user needs to configure the Majordomo only and not other devices the user may add to the home networking. All other interactions among CI or RI and home networking are done by the components implementing our solution. Each user may also enjoy the multimedia experience. The user can buy any devices and name them any way the user wishes, and the user can buy applications and play them on variety of home networking devices without active involvement on the user's part.

The copyright of content providers is protected by ensuring that rights objects and content objects are encrypted with the home networking keys, that the home networks are authenticated, that the issuers are authenticated, and that the permissions for the content are obeyed. Content providers continue to control content, in a sense, even when it physically resides in users' devices. The DRM agents in the home networking track actual consumption of the media and enforce the permissions specified by the copyright owners.

Content providers may also provide multi-media content where they charge for each part of the content separately. They can charge for the audio, video, and text portions if used on separate devices. In a sense, the providers can charge a la carte as opposed to one charge for the whole of the content. Other examples include subscription business models, where users need to pay periodically to keep the content in their homes.

Device manufactures also benefit because, the simple protocols for the home devices provide low processing and memory overhead, thus providing lower cost for the devices. The simple configuration required for the devices to access content leads to wide acceptance of the products among users and content providers.

Figure 8:
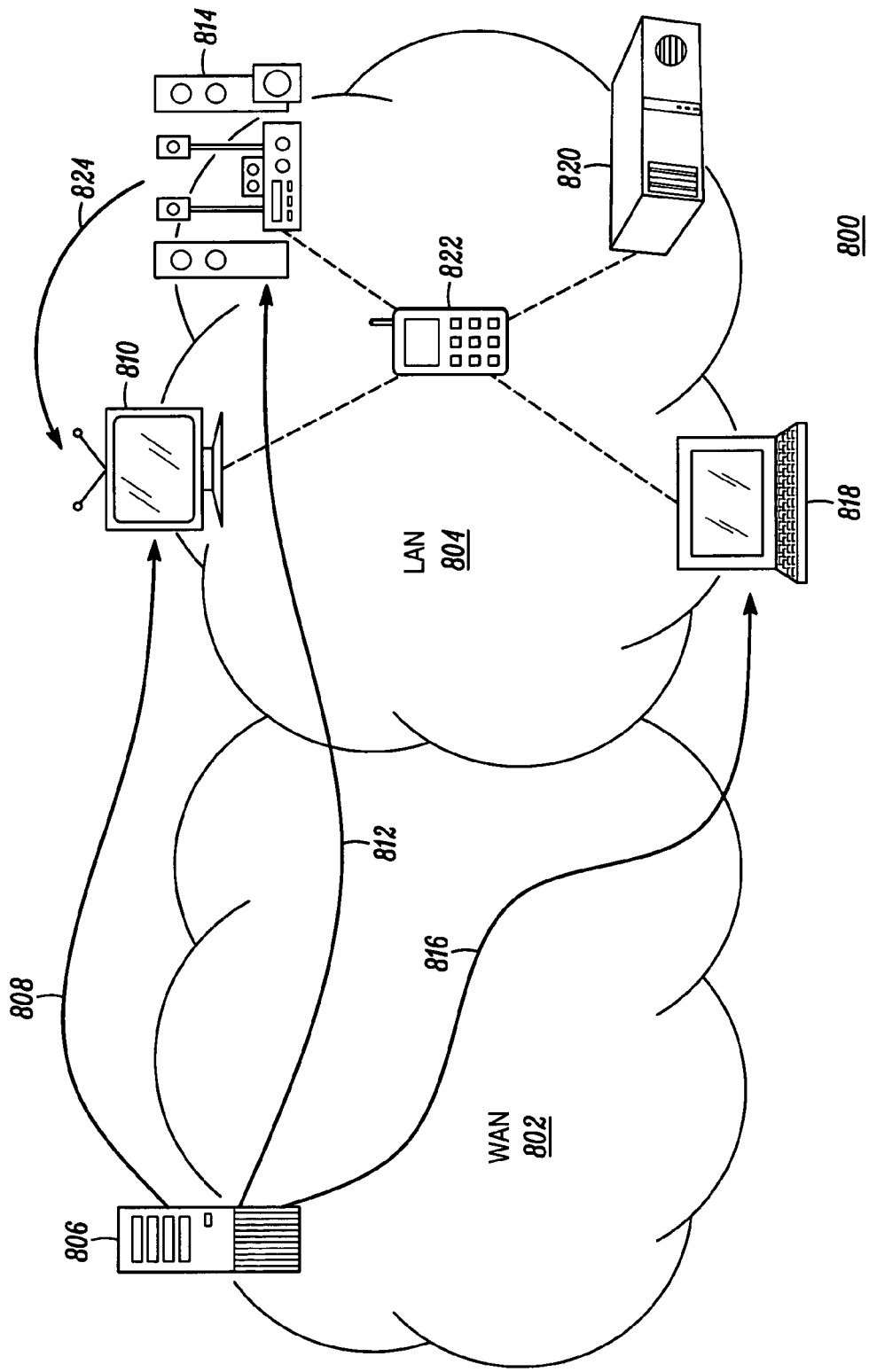
FIG. 8 is a diagrammatic view illustrating a digital security system for transferring rights to media content between networked media device using a controller in accordance with the present invention.

Referring to FIG. 8, there is shown a digital security system 800, similar to other embodiments described above, that includes a wide-area network ("WAN") 802 interconnected for communication with a local area network ("LAN") 804. The WAN 802 includes a media provider or, more particularly, a media server 806 of the media provider. Media content and creative works are available from media servers 106 that customers can access by using WAN 102. The media server 806 provides media content and/or creative work to the LAN 804 so that different portions of the multimedia content are directed to different media devices of the LAN. For example, a video portion 808 may be provided to a video media device 810, such as a flat screen television; an audio portion 812 may be provided to an audio media device 814, such as a stereo; and a text portion 816 may be provided to a text media device 818, such as a computer. Further, the audio portion may be captured by a recording media device 820, such as a digital video recorder ("DVR"), after it plays on the audio media device 814.

The digital security system 800 of FIG. 8 also includes a controller 822 that may be used to transfer media content rights 824 between networked media devices, such as audio and video media devices 814, 810. The controller 822 is shown in FIG. 8 as a wireless communication device that communicates with one or more of the media devices 810, 814, 818, 820 via a wireless communication link, such as the wireless communication devices described above. Although the controller 822 may be a cellular telephone, PDA or a computing device that utilizes a variety of wireless communication technologies, the controller 822 is preferably used for peer-to-peer or ad hoc communications such as HomeRF, Bluetooth and IEEE 802.11 (a, b or g), and other forms of wireless communication, such as infrared and technology utilizing unlicensed/unregulated frequency spectrums. Although not shown in FIG. 8, it is to be understood that the controller 822 may also be wired to, or integrated with, one or more media devices.

For the digital security system 800 of FIG. 8, media content and/or one or more permissions associated with the media content may be transferred from an originating device to a target device. For example, a user of the controller 822 may be listening to the audio portion 812 played by the audio media device 814, and may wish to listen to the audio portion through speakers of the video media device 810 (which is actually a multimedia media device). The audio portion 812 may be stored at the audio media device 814 or streamed to the audio media device in real time. If the audio portion 812 is stored at the audio media device 814, then the controller 822 directs the audio media device 814 to transfer permissions for playing the audio portion to the video media device 810. The controller 822 may also, if necessary, direct the audio media device 814 to transfer the audio portion 812 to the video media device 810 or direct the media server 806 to provide the streamed content to the target device or, for the above example, the video media device 810.

When transferring media content, or a portion thereof, from one media device to another, the user may wish the target device to pick-up the media content at the point where the originating device left-off. For example, the user may wish to have the target device start playing at a mid-point of the media content as soon as the originating media content stops playing at the mid-point of the media content. Also, when transferring a portion of the media content from one media device to another, the user may wish the target device to synchronize the transferred portion with the remaining portions of the media content. For example, when an audio portion 812 is transferred from the audio media device 814 to the video media device 810, the video media device should synchronize execution of the audio portion 812 with execution of the corresponding video and/or text portions 808, 816. For these reasons, synchronization and interim point information, if necessary, should also be provided to the target device.

Figure 9:
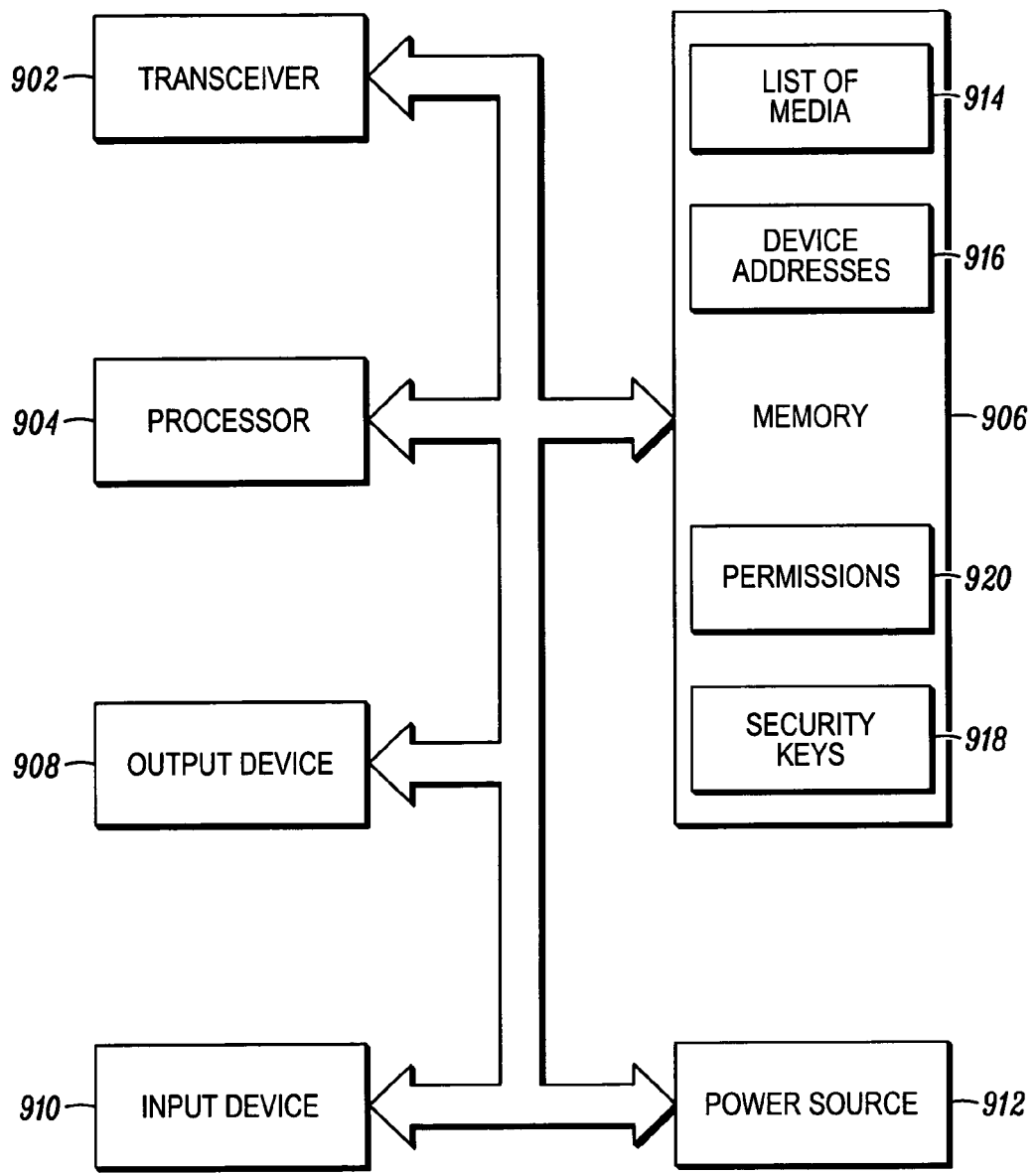
FIG. 9 is a block diagram illustrating exemplary components of the controller of FIG. 8.

FIG. 9 is a block diagram illustrating exemplary components 900 of the controller 822 of FIG. 8. The exemplary components 900 include one or more wired or wireless transceivers 902, a processor 904, a memory 906, one or more output devices 908, and one or more input devices 910. Each embodiment may include a user interface that comprises one or more output devices 908 and one or more input device 910. The internal components 900 may further include a power source 912, such as a battery, for providing power to the other components and enable the controller 822 to be portable, if it is not integrated with one or more media devices.

The input and output devices 908, 910 of the components 900 may include a variety of video, audio and/or mechanical outputs. For example, the output device(s) 908 may include a video output device such as a liquid crystal display and light emitting diode indicator, an audio output device such as a speaker, alarm and/or buzzer, and/or a mechanical output device such as a vibrating mechanism. Likewise, by example, the input devices 910 may include a video input device such as an optical sensor (for example, a camera), an audio input device such as a microphone, and a mechanical input device such as a flip sensor, keyboard, keypad, selection button, touch pad, touch screen, capacitive sensor, motion sensor, and switch. Using one or more of these devices 908, 910, the user interface detects a user selection of one or more media devices from a list of media devices stored in the memory 906.

The memory 906 of the components 900 may be used by the processor 904 to store and retrieve information. The information that may be stored by the memory 906 include, but is not limited to, operating systems, applications, and data. In particular, the memory 906 stores specific data including a list of media devices 914, addresses of one or more devices 916 and security keys 918. The list of media devices 914 identifies media devices capable of receiving the permissions associated with media content of interest from a particular media device. In particular, when an originating device is consuming media content, or a portion thereof, the list of media devices 914 identifies any or all other media devices within the LAN 804 capable of consuming the media content, or the portion thereof, if it is transferred from the originating device. The addresses 916 identify the network addresses of the media devices, including the originating device and, if necessary, the target device. The controller 822 may perpetually store the addresses 916 or may store them on a temporary basis when they are received from external devices, such as the other media devices, a proxy server of the LAN 804 (such as the proxy NAT module of FIG. 5), or the media server 806. The security keys 918, particularly an encryption key, may be used to encrypt the permissions of the current media device that are associated with the media content, to minimize any possible security breach when the permissions are transferred to another media device. The security keys 918, particularly a decryption which may be the same as, or correspond to, the encryption key, may also be used to decrypt the permissions at the receiving media device.

One or more transceivers 902 are capable communicating an address associated with the target device and the encryption key to the originating device. In doing so, the originating device will be able to encrypt the permissions using the encryption key and send the encrypted permissions to the address associated with the target device. The transceiver(s) 902 communicates the address associated with the target device and a security or encryption key 918 to an address associated with the originating device, and may also communicate a decryption key 918 to the originating or target device. The transceiver(s) 902 provide a decryption key 918 directly to the target device, or indirectly to the target device via the originating device so that the originating device may forward the decryption key to the target device. The transceiver may further provide a signal to the originating device that enables the provision of an interim point of the media content to the target device.

In the alternative, the memory 906 may also store permissions 920 associated with media content, or portions thereof. For other embodiments, the controller 822 will not need to store permissions for any media devices. For this alternative embodiment, the controller 822 may be the central facility for storing permissions if one or more media devices are not capable of storing this type of information. Also, the controller may temporarily store permissions received from the originating device and forward them to the target device if these media devices are not capable secure transfers.

It is to be understood that FIG. 9 is for illustrative purposes only and is for illustrating components of a controller 822 in accordance with the present invention, and is not intended to be a complete schematic diagram of the various components required for the controller. Therefore, the controller 822 may include various other components not shown in FIG. 9 and still be within the scope of the present invention.

Figure 10:
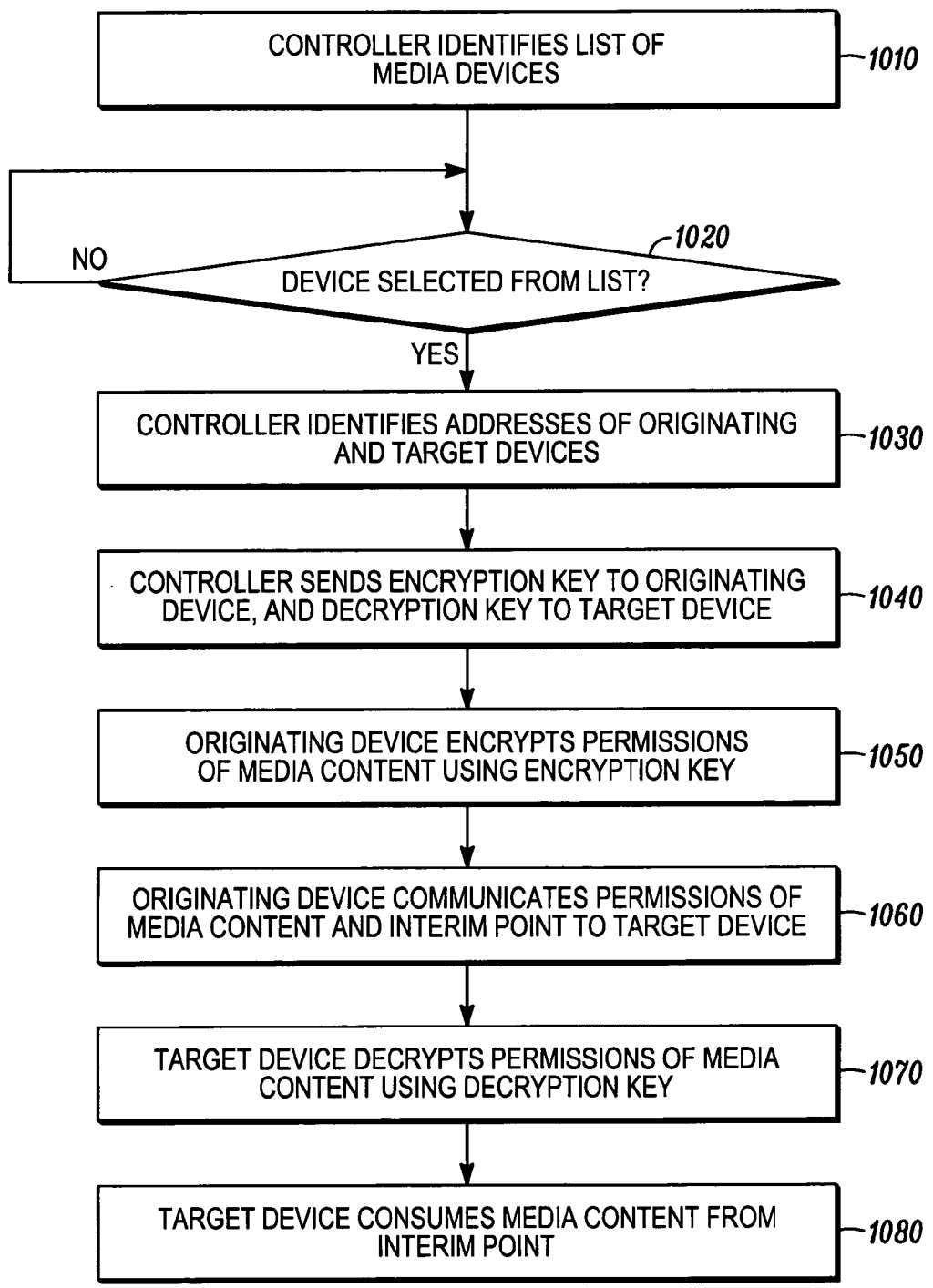
FIG. 10 is a flow diagram illustrating one operation of the digital security system of FIG. 8.

FIG. 10 is a flow diagram illustrating one operation 1000 of the digital security system 800. For this operation, a user of the controller 822 may desire to transfer media content, or a portion thereof, from one media device, i.e., an originating device, of the LAN 804 to another media device, i.e., a target device. When the user expresses this desire to the controller 822, the controller provides a list of potential target devices at an output device 908 of the controller, such as its display, at step 1010. The controller 822 then waits for the user to select a particular target device from the list at step 1020. Next, the controller 822 identifies the addresses of the originating device and the selected target device at step 1030. The controller 822 may have the addresses stored in its memory 906, 916 or retrieve one or more addresses from an external device as described above. The controller 822 may then send an encryption key to the address of the originating device and, if different from the encryption key, a decryption key to the address of the target device at step 1040.

Upon receiving the above information from the controller 822, the originating device may encrypt one or more permissions associated with the media content, or portion thereof, using the encryption key received from the controller at step 1050. The originating device may then communicate permissions associated with the media content, or portion thereof, to the target device at step 1060. The originating device must utilize a secure means for communicating the permissions to the target device, such as a key encryption scheme or dedicated communication line. For one embodiment, the originating device may also communicate synchronization information or interim point information to the target device, as described above in reference to FIG. 8.

The target device, in response to receiving the above information from the controller 822 and the originating device, may decrypt the permissions associated with the media content, or portion thereof, received from the target device using the decryption key or common key received from the controller at step 1070. Thereafter, the target device may consume the decrypted media content, or portion thereof, at step 1080. If synchronization information and/or interim point information is received, then the target device may utilize this information to determine the starting point and/or timing for consuming the content or portion.

Figure 11:
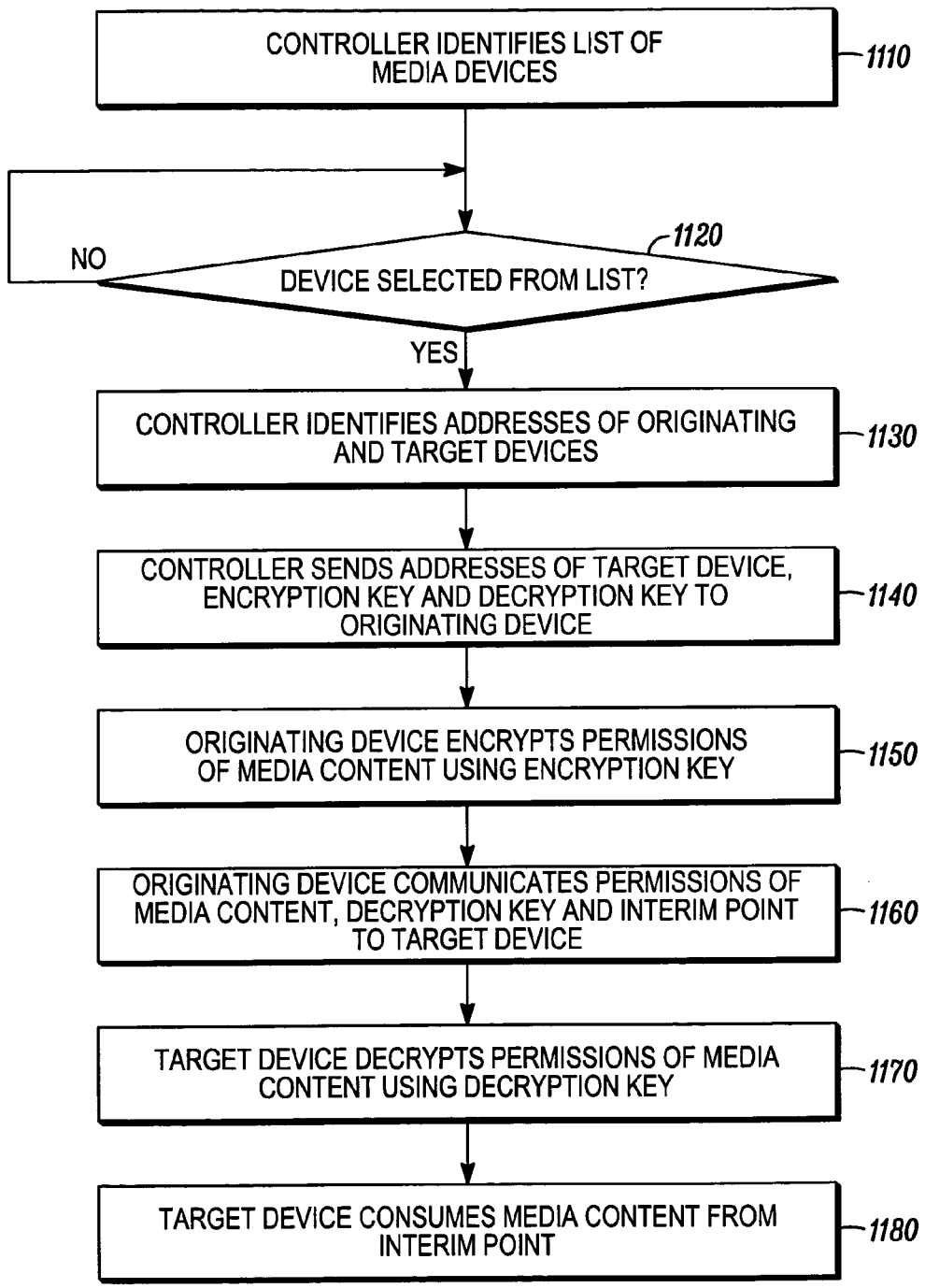
FIG. 11 is a flow diagram illustrating another operation of the digital security system of FIG. 8.

FIG. 11 is a flow diagram illustrating another operation 1100 of the digital security system 800. Again, the controller provides a list of potential target devices at an output device 908 of the controller, at step 1110. The controller 822 then waits for the user to select a particular target device from the list at step 1120. Next, the controller 822 identifies the address of the originating device and, if necessary, the address of the selected target device at step 1130. The controller 822 may have the addresses stored in its memory 906, 916 or retrieve one or more addresses from an external device as described above. The controller 822 may then send an encryption key and, if different from the encryption key, a decryption key to the address of the originating device at step 1140. If the originating device has, or can determine, the address of the target device, then the controller 822 may simply identify the target device to the originating device. If the originating device does not have, or cannot determine, the address of the target device, then the controller 822 may provide the address of the target device to the originating device.

Upon receiving the above information from the controller 822, the originating device may encrypt one or more permissions associated with the media content, or portion thereof, using the encryption key received from the controller at step 1150. The originating device may then communicate permissions associated with the media content, or portion thereof, and a decryption key, which may or may not be the same as the encryption key, to the target device at step 1160. The originating device must utilize a secure means for communicating the permissions to the target device, such as a key encryption scheme or dedicated communication line. For one embodiment, the originating device may also communicate synchronization information or interim point information to the target device, as described above in reference to FIG. 8.

The target device, in response to receiving the above information from the originating device, may decrypt the permissions associated with the media content, or portion thereof, using the decryption key or common key received from the originating device at step 1170. Thereafter, the target device may consume the decrypted media content, or portion thereof, at step 1180. If synchronization information and/or interim point information is received, then the target device may utilize this information to determine the starting point and/or timing for consuming the content or portion.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device for transferring media content rights from a first media device to a second media device, the first media device having permissions associated with a media content, the wireless communication device comprising:
    a memory configured to store a list of media devices capable of receiving the permissions associated with the media content from the first media device and an encryption key that may be used to encrypt the permissions;
    a user interface configured to detect a user selection of the second media device from the list of media devices capable of receiving the permissions associated with the media content from the first media device; and a wireless transceiver configured to:
identify an address associated with the first media device and an address associated with the second media device;
communicate the address associated with the second media device and the encryption key to the address associated with the first media device, so that the first media device is able to encrypt the permissions using the encryption key and send the encrypted permissions and a decryption key to the address associated with the second media device.

2. The wireless communication device of claim 1, wherein the transceiver is further configured to provide the decryption key to the first media device, so that the first media device may forward the decryption key to the second media device.

3. The wireless communication device of claim 1, wherein the transceiver is further configured to provide a signal to the first media device that enables the provision of an interim point of the media content to the second media device.

4. The wireless communication device of claim 1, wherein the transceiver is further configured to communicate the address associated with the second media device and the encryption key to the first media device via a wireless communication link.

5. A method of a wireless communication device for transferring media content rights from a first media device to a second media device, the first media device having permissions associated with a media content, the method comprising:
identifying, by the wireless communication device, a list of media devices capable of receiving the permissions associated with the media content from the first media device;
detecting, by the wireless communication device, a user selection of the second media device from the list of media devices capable of receiving the permissions associated with the media content from the first media device;
determining, by the wireless communication device, an address associated with the first media device and an address associated with the second media device; and
providing, by the wireless communication device, the address associated with the second media device and an encryption key to the address associated with the first media device via a wireless communication link, so that the first media device is able to encrypt the permissions using the encryption key and send the encrypted permissions and a decryption key to the address associated with the second media device.

6. The method of claim 5, wherein providing the address associated with the second media device and an encryption key to the first media device includes providing the decryption key to the first media device, so that the first media device may forward the decryption key to the second media device.

7. The method of claim 5, wherein providing the address associated with the second media device and an encryption key to the first media device includes enabling the provision of an interim point of the media content to the second media device.

8. The method of claim 5, wherein providing the address associated with the second media device and an encryption key to the first media device includes communicating the address associated with the second media device and the encryption key to the first media device via a wireless communication link.

\* \* \* \* \*